(12) United States Patent
Shalabi et al.

(10) Patent No.: US 8,751,569 B2
(45) Date of Patent: *Jun. 10, 2014

(54) ENVIRONMENT AWARE BUSINESS DELEGATES

(71) Applicant: International Business Machines Corporation, Armonk, NY (US)

(72) Inventors: Sami M. Shalabi, Winchester, MA (US); Andrew E. Davis, Arlington, MA (US); Matthew W. Flaherty, Mendon, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,967

(22) Filed: Jan. 5, 2013

(65) Prior Publication Data

US 2013/0191444 A1    Jul. 25, 2013

Related U.S. Application Data

(63) Continuation of application No. 10/984,090, filed on Nov. 9, 2004, now Pat. No. 8,364,748.

(51) Int. Cl.
*G06F 15/16* (2006.01)

(52) U.S. Cl.
USPC .......... 709/203; 709/204; 709/205; 709/206; 709/223; 709/228; 717/100; 345/765; 719/313; 719/315; 719/320

(58) Field of Classification Search
USPC .......... 709/203, 204, 205, 223, 228; 717/100; 719/313, 315, 320; 345/765
See application file for complete search history.

(56) References Cited

U.S. PATENT DOCUMENTS

| | | | |
|---|---|---|---|
| 6,041,306 A * | 3/2000 | Du et al. ................ | 705/7.26 |
| 2003/0058277 A1* | 3/2003 | Bowman-Amuah ........ | 345/765 |
| 2003/0172020 A1* | 9/2003 | Davies et al. ............. | 705/36 |
| 2004/0128644 A1* | 7/2004 | Hurst et al. ............... | 717/100 |
| 2004/0205134 A1* | 10/2004 | Digate et al. .............. | 709/206 |
| 2005/0055449 A1* | 3/2005 | Rappold .................... | 709/228 |
| 2006/0031293 A1* | 2/2006 | Thommes et al. .......... | 709/204 |
| 2006/0259604 A1* | 11/2006 | Kotchavi et al. .......... | 709/223 |
| 2006/0294526 A1* | 12/2006 | Hambrick et al. ......... | 719/315 |
| 2007/0124278 A1* | 5/2007 | Lewis et al. ............... | 707/2 |
| 2008/0109242 A1* | 5/2008 | Shear et al. ............... | 705/1 |
| 2008/0127204 A1* | 5/2008 | Dai et al. .................. | 719/313 |
| 2009/0240542 A1* | 9/2009 | Smith ........................ | 705/7 |
| 2011/0023053 A1* | 1/2011 | Gathman et al. .......... | 719/320 |
| 2011/0126212 A1* | 5/2011 | Lipasek et al. ............ | 719/313 |
| 2011/0247008 A1* | 10/2011 | Tamirisa ................... | 719/313 |
| 2013/0191444 A1* | 7/2013 | Shalabi et al. ............. | 709/203 |
| 2013/0339980 A1* | 12/2013 | Meshar et al. ............ | 719/312 |

* cited by examiner

*Primary Examiner* — Thu Ha Nguyen
(74) *Attorney, Agent, or Firm* — Steven M. Greenberg, Esq.; CRGO Law

(57) ABSTRACT

A method, system and apparatus for an environment aware business delegate. A method for delegating an invoked action in an enterprise application can include determining an environment from which the action has been invoked and selecting a behavior for use which corresponds to the environment. Subsequently, the action can be delegated to the selected behavior for processing in the enterprise application. In a specific aspect of the invention, the determining step can include determining whether the action has been invoked in a server, in an online client or in an offline client.

18 Claims, 2 Drawing Sheets

ENVIRONMENT AWARE BUSINESS DELEGATES

CROSS-REFERENCE TO RELATED APPLICATIONS

This application is a Continuation of U.S. application Ser. No. 10/984,090, filed on Nov. 9, 2004, now U.S. Pat. No. 8,364,748, entitled "ENVIRONMENT AWARE BUSINESS DELEGATES," the entirety of which is incorporated herein by reference.

BACKGROUND OF THE INVENTION

1. Statement of the Technical Field

The present invention relates to the field of enterprise computing and more particularly to the use of delegate logic to separate program logic from presentation logic in an enterprise application.

2. Description of the Related Art

Traditional client server application mix presentation and business logic in the client tier while the server tier provides backend data storage and server side business logic. Consequently, client server applications typically cannot scale within the enterprise given the difficulty in maintaining both the client tier and the server tier. Specifically, changes to the presentation layer of an application require the modification of the client side application which can impact the integrity of the business logic within the client tier. Similarly, changes to the business logic of the client can jeopardize the integrity of the presentation code in the client tier. Developing for the client tier also can be problematic where logic developers further develop the presentation layer, or where human factors designers develop for the logic layer of the application in the client tier.

To force a separation of the presentation and logic layers as is preferred among contemporary computer scientists, server page technologies have become the preferred vehicle for multi-tier application. Server page technologies release the client tier from the responsibility of processing logic for rendering the presentation layer. Moreover, server pages largely separate presentation layer logic from the static elements of the presentation layer so that user interface designers can perform changes to the static elements of the presentation layer without breaching the integrity of the programmatic elements of the presentation layer.

Notwithstanding, presentation-tier components often directly interact with business logic. The direct interaction between the presentation tier can expose the underlying implementation details of the application programming interface (API) for the business logic to the presentation tier. As a result, the presentation tier components can become vulnerable to changes in the implementation of the business logic. Specifically, when the implementation of the business logic changes, so too must the exposed implementation code in the presentation tier.

Also, network performance can be affected when presentation tier components directly interact with business logic because intermediate caching or aggregating can be absent from the equation. Lastly, an exposed API to the business logic can force the client to directly deal with networking issues associated with the distributed nature of bean technologies. Consequently, the business delegate model has been proposed to inject and intermediary between the presentation tier and the business logic of an enterprise application.

In the business delegate model, a business delegate acts as a client-side business abstraction providing an abstraction of the implementation of the underlying of the business logic. Therefore, using a business delegate reduces the coupling so that clients can be shielded from the possible volatility in the implementation of the business logic API. In particular, when the business logic API or underlying business logic changes, the number of changes required in the presentation tier or other tiers which utilize the business delegate can be minimized. As yet an additional advantage, the business delegate can cache results and references to remote business logic thereby improving network performance.

Nevertheless, the business delegate model is not without its own challenges. For one, in many enterprise applications the business logic of the enterprise application can be invoked from a variety of different types of environments. These disparate environments can range from the server environment to a remote client environment, to a remote, off-line client environment. The preferred behavior of a business delegate can vary based upon from which environment the business logic has been invoked. Yet, the business delegate model does not permit a variability in behavior and assumes a single behavior regardless of calling environment.

SUMMARY OF THE INVENTION

The present invention addresses the deficiencies of the art in respect to the business delegate model and provides a novel and non-obvious method, system and apparatus for an environment aware business delegate. In this regard, a method for delegating an invoked action in an enterprise application can include determining an environment from which the action has been invoked and selecting a behavior for use which corresponds to the environment. Subsequently, the action can be delegated to the selected behavior for processing in the enterprise application. In a specific aspect of the invention, the determining step can include determining whether the action has been invoked in a server, in an online client or in an offline client.

The selecting step can include mapping the determined environment to a corresponding behavior specified by a profile in a descriptor file in an archive hosting a delegate for the action. The delegating step, by comparison, can include delegating the action to a method associated with the selected behavior, where the method references a service for the determined environment. Alternatively, the delegating step can include delegating the action to a method associated with the selected behavior where the method references one a service, such as an enterprise bean service or a plain object service. In any case, the method finally can include the step of performing one of pre-processing and post-processing of a result produced by the selected behavior. The pre-processing and post-processing, for example, can include a caching of the result.

An environment aware business delegate archive can include at least one delegate and at least one service. The delegate can reference at least one behavior corresponding to a particular environment specified in an associated referenced profile. The service, by comparison, can define an interface to at least one environment specific service. Finally, the behavior can have at least one association with a method corresponding to the at least one environment specific service. Preferably, the archive also can include a descriptor file specifying different bindings of delegates to different behaviors based upon different invocation environments.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for environment-aware business delegates. In accordance with the present invention, a business delegate model can be expanded to allow for the loose coupling of individual methods of a delegate to one or more services. The coupling can have different defined behaviors depending upon where the delegate has been invoked and the state of the environment in which the delegate has been invoked. For instance, the environment can include server hosted, client hosted and on-line, or client hosted and off-line environments, to name three such environments. The loosely coupled definitions also can include invocation characteristics on a method level, such as caching or method availability, depending upon the environment. Notably, the coupling can be accomplished by way of a descriptor file disposed within an archive for the delegate.

Figure 1:
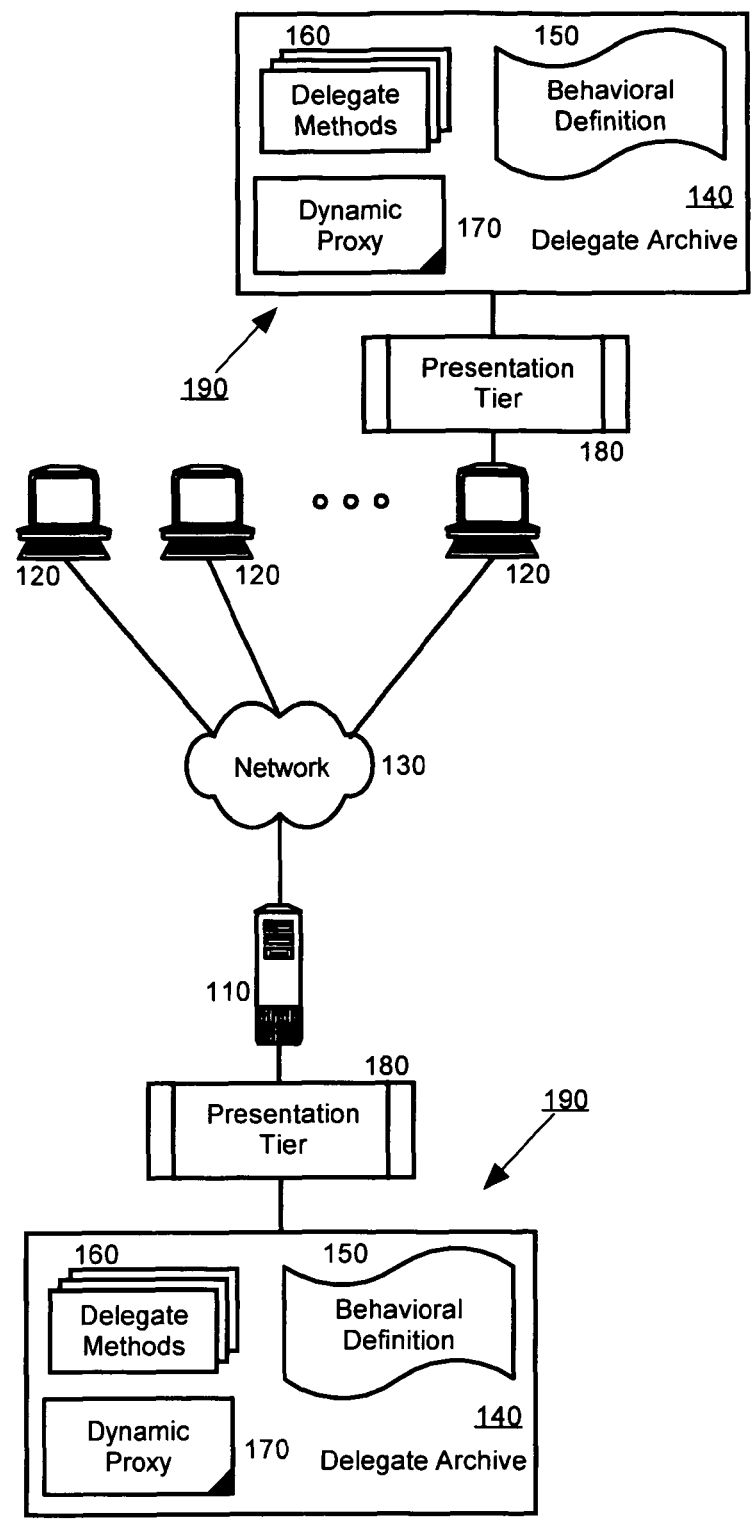
FIG. 1 is a schematic illustration of an enterprise system adapted for use with environment aware business delegates; and, FIG. 2 is an object diagram illustrating an architecture for enterprise aware business delegates in accordance with the inventive arrangements.

In further explanation, FIG. 1 is a schematic illustration of an enterprise system adapted for use with environment aware business delegates. The system can include one or more client computing platforms 120 coupled to a server computing platform 110 over a computer communications network 130. The server computing platform 110 can be configured to host an enterprise application 190 as can selected ones of the client computing platforms 120.

When hosted in the server computing platform 110, the enterprise application 190 can permit user interface interactions with one or more of the client computing platforms 120. By comparison, when hosted in a client computing platform 120, the application can permit user interface interactions within the client computing platform 120. Notably, the client computing platform 120 can host the enterprise application 190 either in an on-line state where interactions with the server computing platform 110 can support aspects of the operation of the application 190, or an off-line state where the server computing platform 110 cannot support aspects of the operation of the application 190.

The enterprise application 190 can include both a presentation tier 180 and a business logic tier (not shown). As part of the business logic tier, a delegate architecture can be implemented through the coupling of a delegate archive 140 to the presentation tier 180. It is to be understood, however, that the delegate archive 140 is not limited for use by the presentation tier 180 and the delegate archive 140 can be utilized by other services for inter-services communication as well. In any case, the delegate archive 140 can include one or more delegates to underlying logical methods 160 in the business logic. The choice of logical methods when responding to interactions in the presentation tier 180 can be controlled by a behavioral definition 150 which can be specified within a descriptor file in the delegate archive 140.

Figure 2:
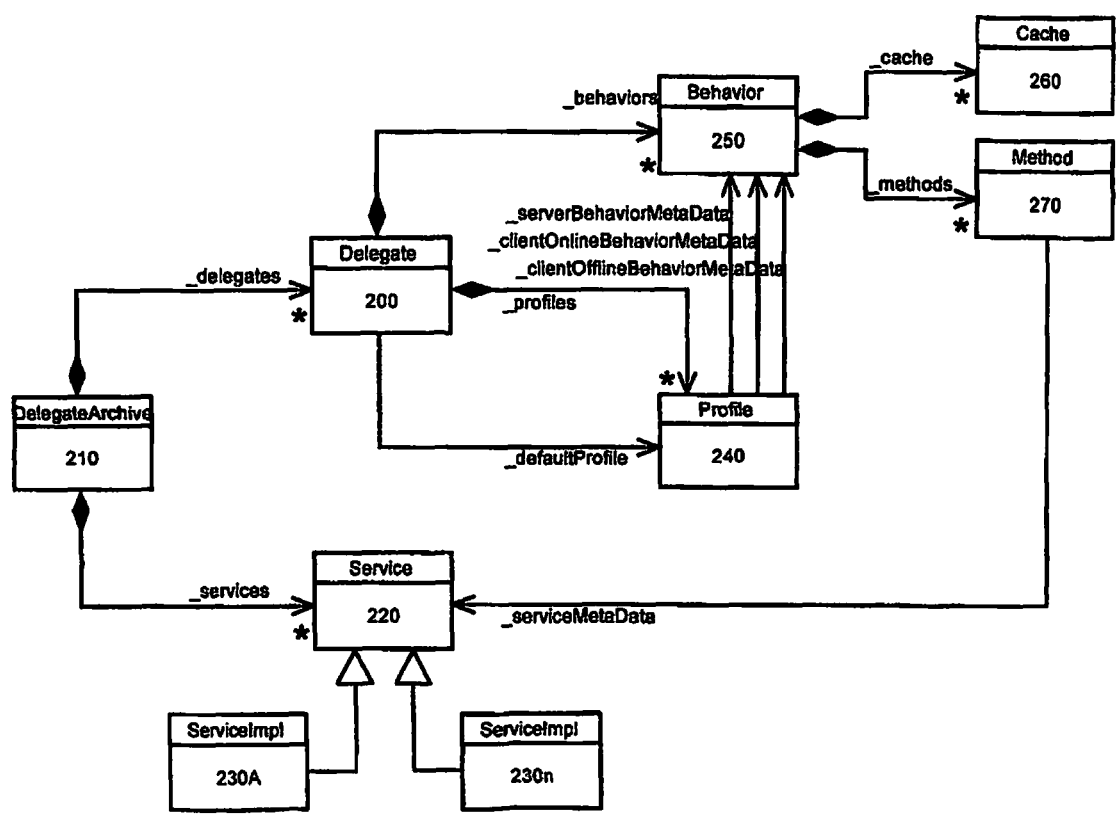

Importantly, a dynamic proxy 170 can consult the behavioral definition 150 when creating an instance of a delegate according to the environment in which the delegate has been invoked. In more particular explanation, FIG. 2 is an object diagram illustrating an architecture for enterprise aware business delegates in accordance with the inventive arrangements. The architecture can include a delegate archive 210 associated with one or more delegates 200 and one or more services 220. The delegate archive 210 can include a top level definition specifying how all delegates 200 behave in the delegate archive 210.

Each instance of the delegates 200 can encapsulate information regarding the delegate such as the name of the delegate, the name of the interface implemented by the delegate and the name of the factory able to produce the delegate. In contrast, each instance of the service 220 can encapsulate a service name and a service type, referring to one or more service type implementations 230A . . . 230n, for instance a bean service or a plain object service. In the case of a bean service, information required to remotely access a bean associated with the service can be encapsulated within the bean service.

Notably, each instance of the delegates 200 can include a reference to one or more behaviors 250 and one or more profiles 240. Each of the behaviors 250 can encapsulate a behavior name. Moreover, each of the behaviors 250 can reference one or more caches 260, and one or more methods 270. In respect to the methods 270, each of the methods 270 can encapsulate information regarding an associated behavior attribute, whether or not the method can support the associated behavior attribute, a set of input parameters, and a method name. Importantly, each of the methods 270 further can include an associated one of the services 220.

In accordance with the present invention, the delegate 200 can be associated with one or more profiles 240 and the delegate 200 can include an instance of a profile 240. Each instance of the profile 240 can include a profile name, a flag indicating whether instance of the profile 240 is a default instance, and one or more instances of a behavior 250. The instances of the behavior 250 can include a server hosted behavior, a client hosted but offline behavior, and a client hosted and client online behavior.

In a preferred aspect of the invention, An extensible markup language ("XML") descriptor file located in the META-INF directory of an archive file can define how the each methods of a delegate behave and how the delegate can be bound to services for each specified environment. Through the use of a dynamic proxy, a module can dispatch calls to the delegate for the appropriate service. Yet, from the perspective of the client, a single object has been called through a single interface, regardless of from where the code for the delegate has been invoked and how the code for the delegate has been invoked.

To load the descriptor in an archive file, an API call can be made as follows:

```
<delegate interface> delegate =
    (<delegate interface>) DelegateProxy.newInstance
    (new ServiceEnvironment( ), <delegate factory class>.class);
```

For example, the call can include:

```
public MyServiceDelegate create( ServiceEnvironment environment)
{
    return (MyServiceDelegate) DelegateFactory.INSTANCE.create
        ( environment, MyServiceDelegateFactoryImpl.class);
}
```

Based upon the exemplary embodiment, the delegate factory class should be disposed in the same archive as the descriptor file and should be defined in the descriptor file. Appendix A includes a pseudo-listing of an exemplary descriptor file. The exemplary descriptor file can include a delegate definition element as a top level element which can include a service element and a delegates element. The services element can contain all definitions for all of the services available for use by the delegate. This element must contain at least one service. Preferably, there are at least two types of supported services: an enterprise bean service and a plain object service.

The enterprise bean service can include as sub-elements, a service name, a specification of whether the service is located in a remote server or in the client bean container, a remote naming and directory interface name for the service, a remote home interface of the service, a remote interface of the enterprise bean service, a local naming and directory interface name for the service, a local home interface of the service, and a local interface of the enterprise bean service. The plain object service, by comparison, can include as sub-elements, a service name, a key for looking up the implementation in application properties, and an interface implemented by the plain object service implementation.

The delegates portion of the descriptor file can include information about the delegates which can include at least one delegate. Notably, there can be at least one delegate per delegate factory defined in the archive file. As sub-elements, the following can be specified in the delegates portion of the descriptor file: at least one delegate which can include a delegate name, a class name of the factory used for the delegate to associate a factory to the delegate, an interface exposed by the delegate, and one or more behaviors. The behaviors can include a behavior that can be bound to state. The behaviors can include a name and a method element defining how methods are bound to services, if at all.

The following elements are sub-elements of the method attribute in the descriptor file: a method name which can include wildcard values, method parameters, and the path to the parameters, and a service name defined in the <services> element to be used for the method. A behavior attribute also can be included which can specify which values are supported or not supported. By supported it is meant that the method is available for invocation. Conversely, by not supported it is meant that the method is not available for invocation. Finally, a cache sub-element can be included which can describe how the return value for the method can be cached.

A profile element also can be specified in the descriptor file. The profile element can specify one or more profiles and at least one profile can be defined as the default profile. Profiles can be used to describe a profile for how the delegate behaves given an environment from which the delegate is invoked. Aside from a profile name, a profile can include as sub-elements a behavior name defined in the <behaviors> element which is used when the delegate is invoked in a particular environment. For instance, a <serverBehavior> behavior is a behavior to be used when the delegate is invoked on the server. Similarly, the <clientOfflineBehavior> is the behavior used when the delegate is invoked on the client and is in an offline state. Finally, the <clientOnlineBehavior> sub-element can indicate a behavior to be used when the delegate is invoked on the client and is in an online state.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for delegating an invoked action in an enterprise application, the method comprising the steps of:
    determining an environment from which the action has been invoked;
    selecting a business delegate behavior for use which corresponds to said environment;
    mapping the determined environment to a corresponding business delegate behavior specified by a profile in a descriptor file in an archive hosting a business delegate for the action, the descriptor file having a business delegate definition element as a top level element, which includes a services element and a business delegates element; and,
    delegating said action to said selected business delegate behavior for processing in the enterprise application.

2. The method of claim 1, wherein said determining step comprises the step of determining whether the action has been invoked in a server.

3. The method of claim 1, wherein said determining step comprises the step of determining whether the action has been invoked in an online client.

4. The method of claim 1, wherein said determining step comprises the step of determining whether the action has been invoked in an offline client.

5. The method of claim 1, wherein the services element contains all definitions for all services available for use by the business delegate.

6. The method of claim 1, wherein the delegates element contains at least one business delegate per delegate factory.

7. The method of claim 1, wherein said delegating step comprises the step of delegating the action to a method associated with said selected business delegate behavior, said method referencing a service for said determined environment.

8. The method of claim 1, wherein said delegating step comprises the step of delegating the action to a method associated with said selected business delegate behavior, said method referencing a service for said determined environment.

9. The method of claim 1, further comprising the step of performing one of pre-processing and post-processing of a result produced by said selected business delegate behavior.

10. A machine readable storage memory having stored thereon a computer program for delegating an invoked action in an enterprise application, the computer program comprising a routine set of instructions which when executed by a machine cause the machine to perform the steps of:
   determining an environment from which the action has been invoked;
   selecting a business delegate behavior for use which corresponds to said environment;
   mapping the determined environment to a corresponding business delegate behavior specified by a profile in a descriptor file in an archive hosting a business delegate for the action, the descriptor file having a business delegate definition element as a top level element, which includes a services element and a business delegates element; and,
   delegating said action to said selected business delegate behavior for processing in the enterprise application.

11. The machine readable storage memory of claim 10, wherein said determining step comprises the step of determining whether the action has been invoked in a server.

12. The machine readable storage memory of claim 10, wherein said determining step comprises the step of determining whether the action has been invoked in an online client.

13. The machine readable storage memory of claim 10, wherein said determining step comprises the step of determining whether the action has been invoked in an offline client.

14. The machine readable storage memory of claim 10, wherein the services element contains all definitions for all services available for use by the business delegate.

15. The machine readable storage memory of claim 10, wherein the delegates element contains at least one business delegate per delegate factory.

16. The machine readable storage memory of claim 10, wherein said delegating step comprises the step of delegating the action to a method associated with said selected business delegate behavior, said method referencing a service for said determined environment.

17. The machine readable storage memory of claim 10, wherein said delegating step comprises the step of delegating the action to a method associated with said selected business delegate behavior, said method referencing a service for said determined environment.

18. The machine readable storage memory of claim 10, further comprising the step of performing one of pre-processing and post-processing of a result produced by said selected business delegate behavior.

* * * * *